US007254231B1

(12) United States Patent
Van Dyke et al.

(10) Patent No.: US 7,254,231 B1
(45) Date of Patent: Aug. 7, 2007

(54) ENCRYPTION/DECRYPTION INSTRUCTION SET ENHANCEMENT

(75) Inventors: Don Van Dyke, Pleasanton, CA (US); Korbin Van Dyke, Sunol, CA (US); Stephen C. Purcell, Mountain View, CA (US)

(73) Assignee: ATI International SRL, Christchruch (BB)

( * ) Notice: Subject to any disclaimer, the term of this patent is extended or adjusted under 35 U.S.C. 154(b) by 0 days.

(21) Appl. No.: 09/419,828

(22) Filed: Oct. 14, 1999

(51) Int. Cl.
*H04L 9/06* (2006.01)
(52) U.S. Cl. .................................... 380/29; 713/189
(58) Field of Classification Search .............. 380/29, 380/37, 42, 43, 28, 257; 713/189, 190
See application file for complete search history.

(56) References Cited

U.S. PATENT DOCUMENTS

| 5,381,480 | A | * | 1/1995 | Butter et al. ............... 380/37 |
| 5,787,026 | A | * | 7/1998 | Orenstein et al. .......... 708/521 |
| 5,958,038 | A | * | 9/1999 | Agrawal et al. ............ 712/36 |
| 6,028,939 | A | * | 2/2000 | Yin ........................... 713/189 |
| 6,088,800 | A | * | 7/2000 | Jones et al. ................ 713/189 |
| 6,118,870 | A | * | 9/2000 | Boyle et al. ............... 380/201 |
| 6,266,418 | B1 | * | 7/2001 | Carter et al. .............. 380/257 |

OTHER PUBLICATIONS

Schneier, Applied Cryptography, Protocols, Algorithms, and Source Code in C, 1996, John Wiley and Sons, Second Edition, pp. 270-277.*
Data Encryption Standard (DES), Chapter 12, pp. 270-277, 1996.

* cited by examiner

*Primary Examiner*—Matthew Smithers
(74) *Attorney, Agent, or Firm*—Vedder, Price, Kaufman & Kammholz, P.C.

(57) ABSTRACT

A structure and associated method to implement encryption/decryption under the Data Encryption Standard (DES). Several additional instructions are included in the instruction set of a general purpose microprocessor to operate in conjunction with hardware included in a data path of the general purpose microprocessor. The additional instructions perform a portion of the DES algorithm, in particular, a portion of a DES round. The state information used at each step of the encryption portion of the DES algorithm is provided in various general purpose registers of the general purpose microprocessor. In one embodiment, all sixteen subkeys are selected prior to the DES step in the general processor after a DES key is known. In another embodiment, each subkey is selected during the round it is used. In yet another embodiment, each subkey is selected during the round it is used, as part of an additional instruction executed by the general purpose microprocessor.

21 Claims, 4 Drawing Sheets

ENCRYPTION/DECRYPTION INSTRUCTION SET ENHANCEMENT

FIELD OF THE INVENTION

This invention relates to encryption and decryption, and in particular to an encryption/decryption method under the Data Encryption Standard.

BACKGROUND OF THE INVENTION

The Data Encryption Standard (DES) algorithm is a block cipher and specifies a cryptographic algorithm that encrypts, using a key, a 64-bit block of plaintext to a 64-bit block of ciphertext. DES is a symmetric algorithm—i.e., the same algorithm and same key are used to decrypt the 64-bit block of ciphertext back to a 64-bit block of plaintext. DES is described in detail in a book by BRUCE SCHNEIER, APPLIED CRYPTOGRAPHY (1996), incorporated by reference herein.

The goal of DES is to encrypt the data such that every bit of the ciphertext depends on every bit of the data and every bit of the key. DES is intended to achieve, after a number of "rounds", zero correlation between the ciphertext and the original data or key. DES accomplishes this goal using two basic techniques of cryptography—confusion and diffusion. At the simplest level, diffusion is achieved through numerous permutations and confusion is achieved through XOR operations.

In DES, a 56-bit key is derived from a 64-bit key by omitting every eighth bit (The omitted bits can be used as parity to enhance data integrity). Security in DES relies upon the 56-bit key, which can be any 56-bit number and can be changed at any time. From this 56-bit key, 16 different 48-bit subkeys are created for use in 16 DES rounds. FIG. 1 shows a DES algorithm operating on 64-bit of plaintext 110. As shown in FIG. 1, the DES algorithm consists of an initial permutation (IP) operation 112 and a final permutation ($IP^{-1}$) operation 120, and 16 rounds of encryption operations 114-1 to 114-16. After IP operation 112, plaintext 110 is divided into 32-bit right portion $R_0$ and 32-bit left portion $L_0$. Thereafter, 16 rounds of an identical operation (including "Function f", explained below) are applied on permuted plaintext 110 using subkeys $K_1$ through $K_{16}$ (subkeys are explained in further detail below). $IP^{-1}$ operation 120 provides ciphertext 122, thereby completing the DES algorithm.

IP operation 112 and $IP^{-1}$ operation 120 provide no additional security. During IP operation 112, a DES integrated circuit loads a 64-bit datum. $IP^{-1}$ operation 120 is an inverse operation for IP operation 112. Although IP operation 112 and $IP^{-1}$ 120 can be easily implemented in hardware, these operations cannot be efficiently implemented in software. Hence, due to performance considerations, a software implementation of DES often omits IP operation 112 and $IP^{-1}$ operation 120. While omitting these operations does not compromise security, this modified DES algorithm deviates from the DES standard.

FIG. 2 shows a DES round in further detail. As shown in FIG. 2, a 56-bit key 210 is divided into two 28-bit key portions 210a and 210b, which are then stored. Then, depending on which of the sixteen rounds is currently being executed, stored key portions 210a and 210b are circularly shifted left by either one or two bits. Forty-eight (48) bits of shifted key portions 210a and 210b are selected in compression permutation operation 212 as the subkey $K_i$ for that round. Simultaneously, a 64-bit block of text from either IP operation 112 (first round), or the previous round (i.e., (i–1)th round) is divided into 32-bit left portion $L_{i-1}$ and 32-bit right portion $R_{i-1}$. Using expansion permutation operation 220, right portion $R_{i-1}$ is expanded to 48 bits. Like IP operation 112, expansion permutation operation 220 can be implemented readily in hardware but cannot be efficiently implemented in software. The 48-bit output value of expansion permutation operation 220 is then combined with the 48-bit key $K_i$ using XOR operation 225. The 48-bit result of XOR operation 225 is then processed by 8 substitution box (S-box) operations 222, which results in a 32-bit value 226. 32-bit value 226 is then permuted by a permutation box (P-box) operation 224 to provide a 32-bit value 228. Expansion permutation operation 220, XOR operation 225, S-box substitution operation 222 and P-box permutation 224 together constitute Function f, which is a building block of the DES algorithm. 32-bit output value 228 of Function f is then combined with left portion $L_{i-1}$ using an XOR operation 227. The result of XOR operation 227 is to be used as right portion $R_i$ in the next round. Right portion $R_{i-1}$ is provided as left portion $L_i$ in the next round, using a swap operation indicated by reference numeral 230. At the end of the 16th round, right portion $R_{15}$ of the 15th round becomes the left 32 bits, and right portions $R_{16}$ becomes the right 32 bits, for $IP^{-1}$ operation 120.

As the encryption/decryption process of the DES algorithm of FIG. 1 is too computationally demanding for a software implementation on a general purpose microprocessor, the DES algorithm is often implemented by an array of identical special purpose modules outside of the microprocessor. However, several drawbacks are inherent in such an approach. First, partitioning the encryption/decryption tasks between the microprocessor and the special purpose modules is complex, especially since different instruction sets are executed by the microprocessor and the special purpose modules. Second, the total silicon area devoted in the integrated circuit for the special-purpose modules is large and costly. Third, the shear number of special purpose modules on the integrated circuit causes decentralization of data flow.

Due to the complexity of the DES algorithm, especially expansion and permutation operations, a software DES implementation is prohibitively slow.

Therefore, a method for implementing the DES algorithm is needed which (a) does not require special purpose modules, (b) combines all data flow into a unified data path, and (c) executes the DES algorithm quickly and inexpensively.

SUMMARY OF THE INVENTION

In accordance with the present invention, several additional instructions are included in the instruction set of a general purpose microprocessor to operate in conjunction with hardware included in a data path of the general purpose microprocessor. The additional instructions perform a portion of the DES algorithm, in particular, a portion of a DES round. The state information used at each step of the encryption portion of the DES algorithm is provided in various general purpose registers of the general purpose microprocessor.

In one embodiment, all sixteen 48-bit subkeys are selected prior to the DES step in the general processor after a 56-bit DES key is known. In another embodiment, each subkey is selected during the round it is used. In yet another embodiment, each subkey is selected during the round it is used, as part of an additional instruction executed by the general purpose microprocessor.

Hence, the present invention implements the DES algorithm without the special purpose modules of the prior art. In addition, because hardware is used to implement the part of the DES algorithm which cannot be efficiently implemented in software, the present invention provides improved performance over a software implementation of the prior art. Furthermore, because the general purpose registers store attributes and parameters of the added instruction of the present invention, data flow is unified.

The present invention is more fully understood in light of the following detailed description taken together with the accompanying drawings.

DETAILED DESCRIPTION OF THE PREFERRED EMBODIMENTS

In one embodiment, the present invention provides, in a general purpose microprocessor, a DES instruction "DSTEP" which carries out Function f in a small amount of additional hardware in a data path, while storing the states of the DES algorithm, i.e., the $L_i$'s, $R_i$'s and the subkeys $K_i$'s, in general purpose registers. The remainder of the DES algorithm is carried out by general purpose instructions of the general purpose microprocessor. The present invention eliminates the special purpose modules of the prior art and achieves high performance by executing a part of the DES instruction in the general purpose hardware (e.g., the general purpose registers for storing attributes and parameters, datapath and control) and performing repetitious tasks in the small amount of additional hardware. Under this approach, the present invention can achieve a speed improvement by an order of magnitude over software implementations of the DES algorithm in the prior art. Data flow is unified by placing the additional hardware in the data path of the general purpose processor. Instruction DSTEP is defined in Appendix A.

Figure 3:
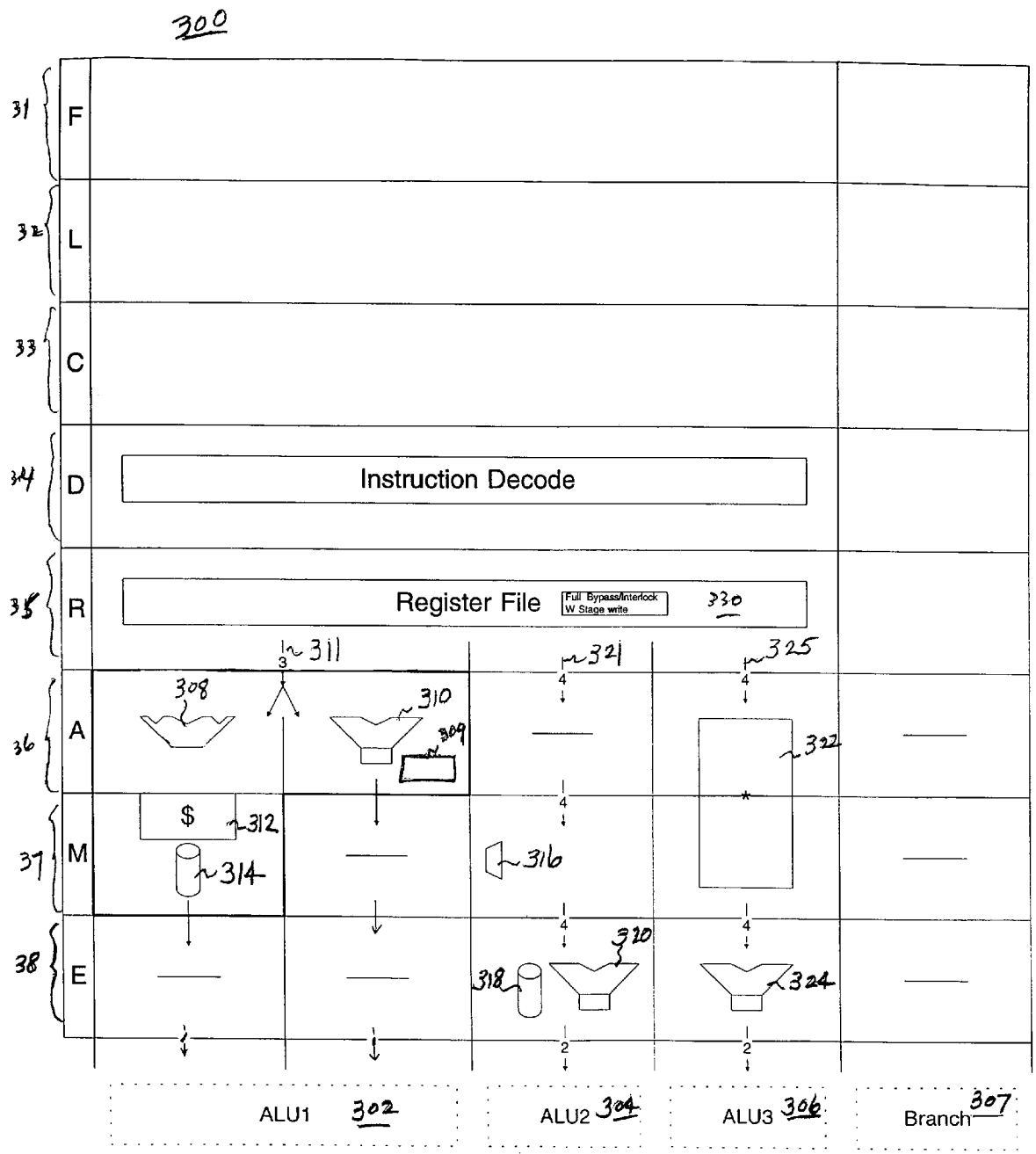
FIG. 3 is a block diagram 300 schematically depicting instruction execution in a general purpose microprocessor, including scheduling of additional hardware for performing a part of the DES algorithm, in accordance with the present invention.

FIG. 3 is a block diagram showing instruction execution in a general purpose processor adapted with additional hardware for execution of the "DSTEP" instruction, in accordance with the present invention. The general purpose processor executes multiple instructions in parallel using pipelining. As shown in FIG. 3, an instruction is fetched initially from memory at pipeline stage 31 (labeled "F"). In this embodiment, the general processor supports instructions of various lengths. Thus, pipeline stage 32 is provided to allow alignment of the fetched instruction to the proper byte boundary. Pipeline stage 33 performs target prediction for a branch instruction. Branch prediction is carried out in a special "branch" arithmetic logic unit 307. In addition, pipeline stage 33 is provided also to allow an instruction of a selected group of instructions of the instruction set to be converted to another instruction or instructions for more efficient execution. At pipeline stage 34, the loaded instruction is decoded. At pipeline stage 35, operands for the decoded instructions are read from general purpose register file 330. For example, general purpose registers are allocated at run-time to store the $L_i$'s, $R_i$'s and the subkeys $K_i$'s for each round of the DES algorithm. The DES round input and the DES round output are stored in a byte-interleaved form.

The general purpose processor has three arithmetic logic units ("ALUs", shown in FIG. 3 as ALUs 302, 304 and 306) with overlapping execution in pipeline stages 36, 37 and 38, which are provided for address generation, memory access and instruction execution stages, respectively. Arrows 311, 321 and 325 represent 192 bits, 256 bits and 256 bits of input data fetched from register file 330 or the bypass mechanism into ALU 302, ALU 304 and ALU 306, respectively. ALU 302 includes an adder 308, a 2-input arithmetic logic unit 310 and a shifter 314. Adder 308 and ALU 310 operate independently. Adder 308 and ALU 310 are synchronized to address generation pipeline stage 36, which generates addresses for memory access (e.g., fetching an operand from memory). Within the timing of address generation pipeline stage 36, is provided a logic circuit 309, which is adapted for executing the DSTEP instruction. Logic circuit 309 performs Function f and XOR operation 227 described above and is shown in detail in FIG. 4. Logic circuit 309 operates in parallel with ALU 310.

Figure 4:
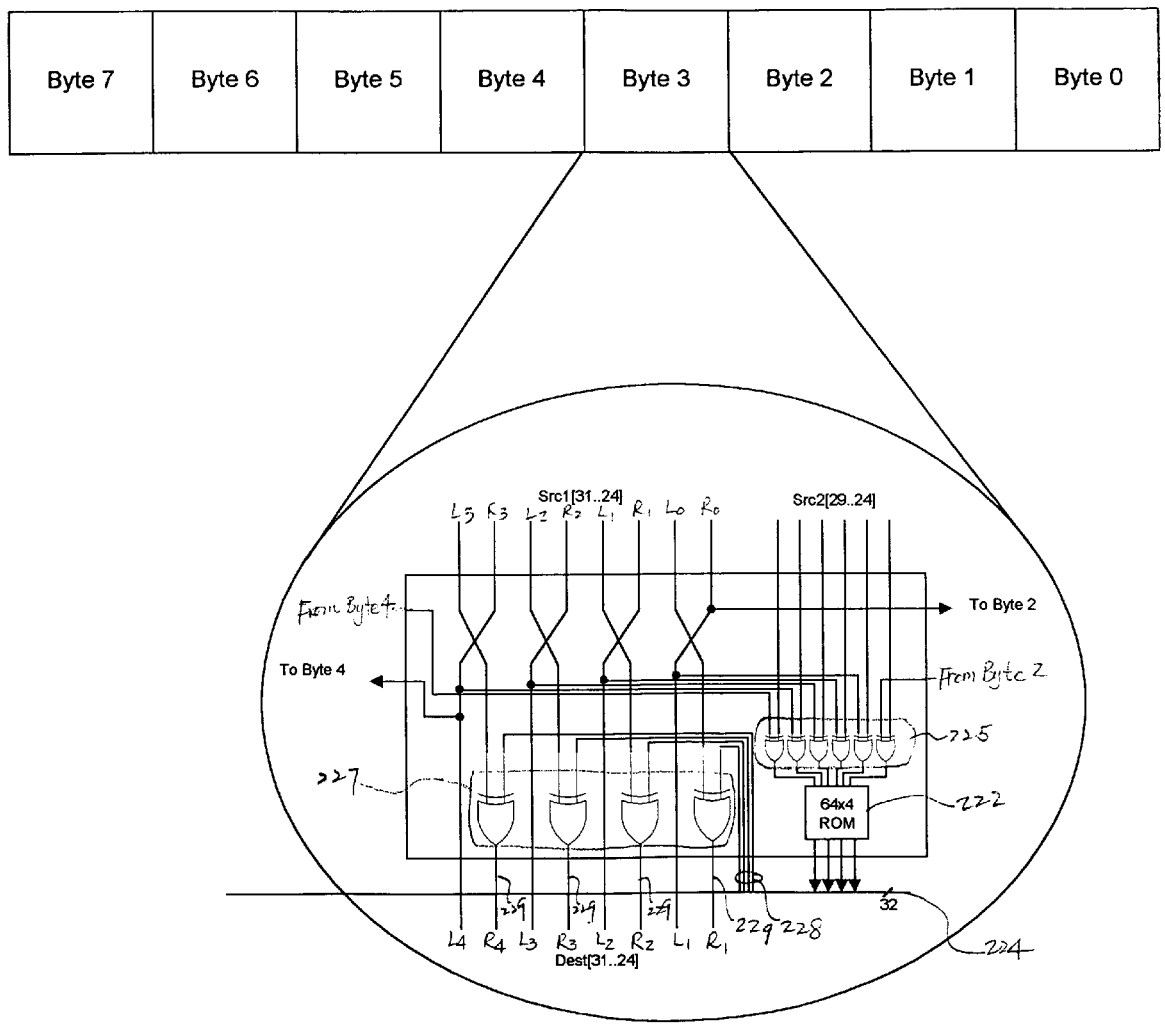
FIG. 4 is a schematic of the hardware executing DSTEP.

Referring to FIG. 4, first operand Src1 and second operand Src2 represent two 64-bit registers obtained directly from the register file or on the fly from the bypass structure. Byte 0 through Byte 7 represent the bytes in first operand Src1 and second operand Src2. For example, Byte 0 contains bits 0 through 7 of first operand Src1 and second operand Src2; Byte 1 contains bits 8 through 15 of first operand Src1 and second operand Src2; Byte 2 contains bits 16 through 23 of first operand Src1 and second operand Src2; Byte 3 contains bits 24 through 31 of first operand Src1 and second operand Src2; and so on. Each byte has identical associated circuitry and is cascaded to the circuitry before and after it. For example, circuitry associated with Byte 3 is cascaded to the circuitry associated with Byte 2 and the circuitry associated with Byte 4. Therefore, only the circuitry associated with one byte, i.e., Byte 3, is explained in detail below.

Figure 1:
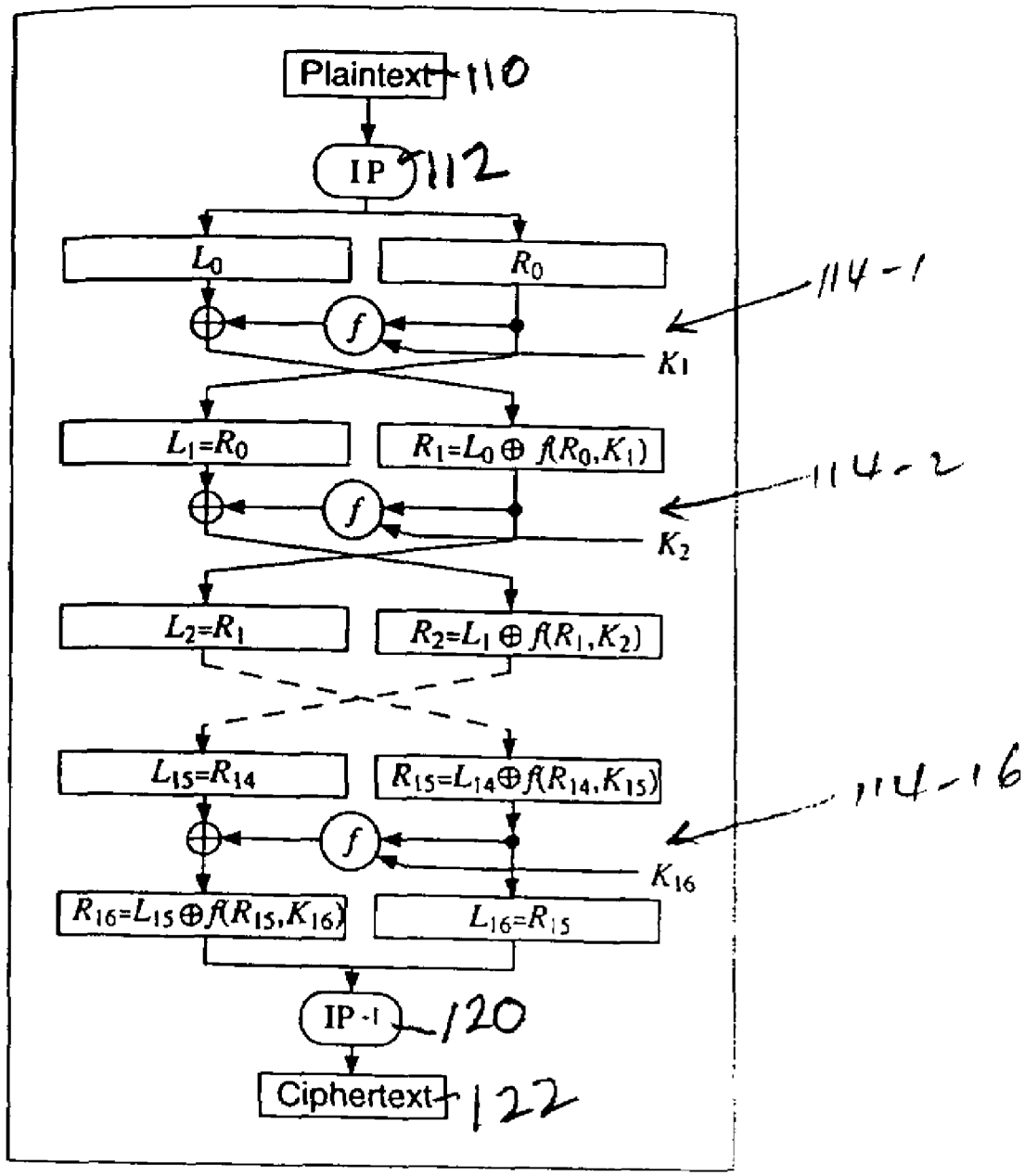
FIG. 1 depicts a Data Encryption Standard (DES) algorithm implementation.
Figure 2:
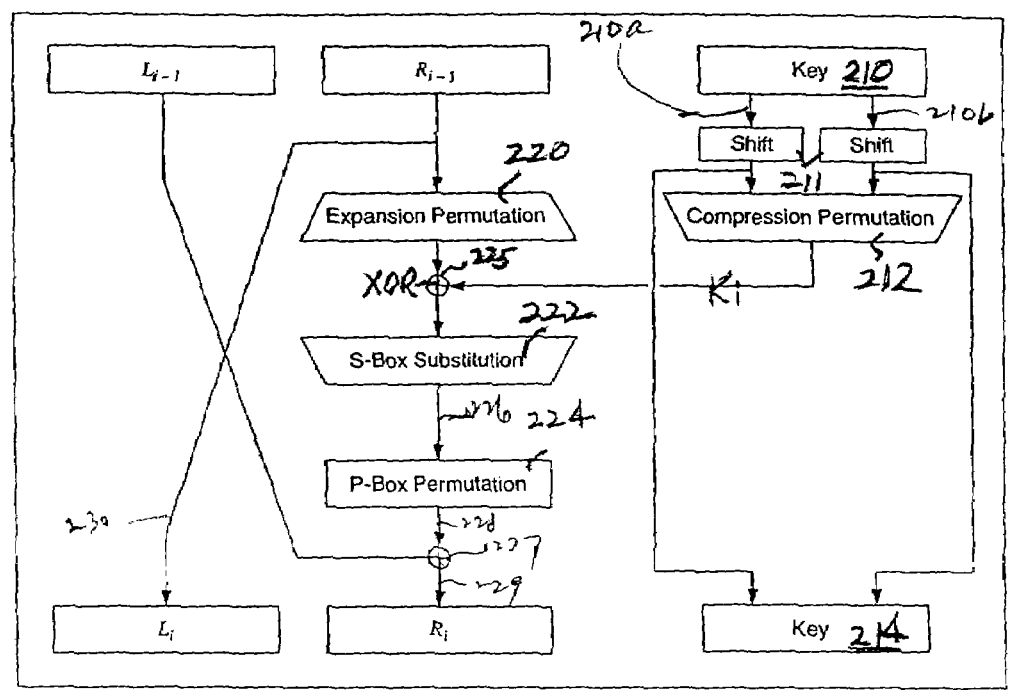
FIG. 2 depicts one round of the DES algorithm.

First operand Src1 is the combined left portion $L_i$ and right portion $R_i$ which are interleaved. For example, first operand Src1 contains right portion $R_0$, left portion $L_0$, through right portion $R_3$ and left portion $L_3$. It is noted that right portion $R_i$ goes through an expansion permutation 220 (FIG. 2) which expands the right portion $R_i$ from 32 to 48 bits. Two bits of second operand Src2 are discarded to perform the compression permutation 212 (FIG. 2) which compresses each byte to six bits (e.g., bits 24 through 29), which are part of a subkey $K_i$. The set of six XOR operations, representing XOR operation 225 in FIG. 2, XOR the portion of subkey $K_i$ generated above and the expanded right portions $R_0$ through $R_3$. The result of XOR operation 225 is then processed by a 64×4 ROM which represents S-box substitution 222 in FIG. 2. The result of S-box substitution 222 is then processed by P-box permutation 224 which is represented by 32 wires on the bottom of the expanded view in FIG. 4. The result 228 of P-box permutation 224 is XORed with left portion $L_0$ through $L_3$ by XOR operation 227 which is represented by four XOR operations. The result 229 of XOR operation 227 becomes the right portion $R_1$ through $R_4$ for the next round and the right portion $R_0$ through $R_3$ become the left portion $L_1$ through $L_4$ for the next round. The new right portions and left portions are stored in a 64-bit destination register Dest. The combined Byte 3 of first operand Src1 and second operand Src2 is stored as Byte 3, i.e., bits 24 through 31, of destination register Dest.

Referring back to FIG. 3, memory access pipeline stage 37 generates memory access requests using the address generated at stage 36 from adder 308. If the memory access can be satisfied from conventional cache 312, the requested data are provided as output values at the end of memory access pipeline stage 37, aligned appropriately via shifter 314. ALU 310 or logic circuit 309 provide a second result at the end of the address generation pipeline stage 36, which is piped through memory access pipeline stage 37 to instruction execution pipeline stage 38. The results of ALU 302 are written back into register file 330 according to the timing of instruction execution pipeline stage 38.

Second ALU 304 includes a conventional variable shifter (composed of a shift amount decoder 316 feeding a shift array 318) and 2-input ALU 320. Thus, the execution in shift amount decoder 316 is aligned to memory access pipeline stage 37 and the executions of shift array 318 and 2-input ALU 320 are aligned with instruction execution pipeline stage 38. The results of shift array 318 and 2-input ALU 320 are written back into register 330 within the timing of instruction execution pipeline stage 38. Shift array 318 and 2-input ALU 320 execute independently.

ALU 306 includes a conventional multiplier 322 and a conventional 4-input ALU 324. Multiplier 322 has a latency that spans pipeline stages 36 and 37. The output value of multiplier 322 is provided to ALU 324, which provides a 128-bit output value. Thus, execution of multiplier 322 is aligned to both address generation pipeline 36 and memory access pipeline 37, and execution of ALU 324 and writing back of results into register file 330 are aligned to instruction execution pipeline stage 38.

In one embodiment, instruction DSTEP is executed in ALU 302. In the particular configuration described above, processing within the first stage of ALU 302 is not necessary but advantageous because the output value is available earlier in the pipeline. Further, the latency of address generation pipeline stage 36 closely matches the timing of logic circuit 309, so that no modification of timing control of address generation pipeline stage 36 or any other pipeline stage is necessary.

In this embodiment, subkey $K_i$ is selected using instructions of the general purpose processor. The programmer can choose to select all 16 subkey $K_i$'s when the key value is received, or just before executing the DSTEP instruction. The instructions for key selection can be executed in ALU 302 or 304. Thus, some benefits of parallel execution can be achieved in some instances, as key selection operations can overlap—while DSTEP executes in ALU 302, key selection for the next round can execute in ALU 304. Alternatively, a logic circuit for subkey selection can be included in logic circuit 309 to provide even higher performance. In this embodiment, in the DSTEP instruction, left and right portions $L_i$ and $R_i$ and subkey $K_i$ are passed using three general purpose registers. In the alternative, 32-bit registers can be used because 64-bit registers are no longer required.

IP operation 112 and $IP^{-1}$ operation 120 can be executed in either one of ALUs 302 and 304.

In this embodiment, bypass mechanisms are provided in ALU 302, so that the results of logic circuit 309 and shifter 314 can each be provided back as input values to ALU 302. If the programmer uses the same corresponding general purpose registers for sources and destinations, all sixteen rounds of DSTEP can be executed using the bypass mechanism—i.e., no register write back time (i.e., latency of instruction execution pipeline stage 38) is required, thereby providing even higher performance. Bypass mechanisms are also provided elsewhere in ALUs 302, 304, and 306, so results may be immediately used as operands without delaying through instruction execution pipeline stage 38.

Although the invention has been described with reference to particular embodiments, the description is only an example of the invention's application and should not be taken as a limitation. Various other adaptations and combinations of features of the embodiments disclosed are within the scope of the invention as defined by the following claims.

We claim:

1. A computer system capable of performing encryption or decryption under a Data Encryption Standard (DES) algorithm, comprising:

a general purpose microprocessor operative to carry out a DES instruction and comprises an arithmetic logic unit having a logic circuit for performing expansion permutation, S-box substitution, P-box permutation and associated XOR operations;

wherein said computer system further comprises a register file providing operands to said arithmetic logic unit; and wherein said register file includes general purpose registers that store states of the DES algorithm.

2. The method of claim 1, wherein said register file includes a first register for storing a first portion of a datum for said encryption or decryption, a second register for storing a second portion of said datum and a third register for storing a subkey.

3. The computer system of claim 2, wherein said datum is 64 bits long and said subkey is 48 bits long.

4. The computer system of claim 2, wherein said first and second portions each contain one-half number of bits of said datum.

5. The computer system of claim 4, wherein each of said first and second portions is 32 bits long.

6. The computer system of claim 2, wherein said first, second and third registers store operands of the DES instruction executing one round of said DES algorithm using said logic circuit and a shift circuit in said arithmetic logic unit, said instruction designating the storage of results in said first, second and third registers in such manner as to allow said results in said first, second and third registers to be operands in a subsequent execution of said instruction.

7. The computer system of claim 6, wherein a bypass mechanism is provided in said register file such that said results are provided as input to said logic circuit without first being written back to said first, second and third registers.

8. The computer system of claim 7, wherein said register file and said bypass mechanism are shared by all instructions in said arithmetic logic unit.

9. The computer system of claim 1, further comprising a second logic circuit capable of performing key selection for said DES algorithm, said second logic circuit operating in parallel with said logic circuit.

10. The computer system of claim 1, wherein said logic circuit further comprises a circuit for selecting a subkey from a key.

11. The computer system of claim 10, wherein said key is 56 bits long.

12. A process for performing encryption or decryption under a Data Encryption Standard (DES) algorithm, comprising:

executing a DES instruction on a general purpose microprocessor;

providing a logic circuit in an arithmetic logic unit;

performing expansion permutation, S-box substitution P-box permutation and associated XOR operations in said logic circuit based on the DES instruction;
storing operands in a register file;
providing said operands to said logic circuit; and
wherein said register file includes general purpose registers that store states of the DES algorithm.

13. The process of claim 12, further comprising:
storing operands in a register file; and
providing said operands to said logic circuit.

14. The process of claim 13, further comprising:
storing a first portion of a datum for said encryption or decryption in first register in said register file;
storing a second portion of said datum for said encryption or decryption in second register in said register file; and
storing a subkey for said encryption or decryption in third register in said register file.

15. The process of claim 14, further comprising storing operands of an instruction executing one round of said DES algorithm in said first, second and third registers using said logic circuit and said shift circuit, said instruction designating the storage of results in said first, second and third registers in such manner as to allow said results in said first, second and third registers to be operands in a subsequent execution of said instruction.

16. The process of claim 15, further comprising providing said results as input to said logic circuit without first being written back to said first, second and third registers.

17. The process of claim 12, further comprising selecting a subkey from a key for said DES algorithm in a second logic circuit.

18. The process of claim 17, further comprising operating said second logic circuit in parallel with said logic circuit.

19. The process of claim 12, further comprising selecting a subkey from a key using a key select circuit in said logic circuit.

20. A computer system capable of performing encryption or decryption under a Data Encryption Standard (DES) algorithm, comprising:
 a general purpose microprocessor that comprises an arithmetic logic unit having a logic circuit for performing expansion permutation, S-box substitution, P-box permutation and associated XOR operations;
 wherein said computer system further comprises a register file providing operands to said arithmetic logic unit; and
 wherein said register file includes general purpose registers to store at least two of attributes, parameters, datapath, control, $L_i$'s, $R_i$'s, and subkeys $K_i$'s.

21. The computer system of claim 20, wherein said register file includes a first register for storing a first portion of a datum for said encryption or decryption, a second register for storing a second portion of said datum and a third register for storing a subkey.

* * * * *